(12) United States Patent
Yaari et al.

(10) Patent No.: US 12,164,661 B1
(45) Date of Patent: Dec. 10, 2024

(54) SECURITY INTERFACE FOR CONTROLLING ACCESS TO EMAIL-DATA

(71) Applicant: Grip Security Ltd, Tel Aviv (IL)

(72) Inventors: Lior Chaim Yaari, Boston, MA (US); Idan Pinchas Fast, Tel Aviv (IL); Alon Shenkler, Tel Aviv (IL)

(73) Assignee: Grip Security Ltd, Tel Aviv (IL)

( * ) Notice: Subject to any disclaimer, the term of this patent is extended or adjusted under 35 U.S.C. 154(b) by 0 days.

(21) Appl. No.: 18/426,469

(22) Filed: Jan. 30, 2024

(51) Int. Cl.
*G06F 21/62* (2013.01)
(52) U.S. Cl.
CPC .............................. *G06F 21/6218* (2013.01)
(58) Field of Classification Search
None
See application file for complete search history.

(56) References Cited

U.S. PATENT DOCUMENTS

| | | | | |
|---|---|---|---|---|
| 10,255,445 | B1* | 4/2019 | Brinskelle | G06F 21/606 |
| 11,531,967 | B2* | 12/2022 | Aboel-Nil | G06Q 10/107 |
| 2005/0203800 | A1* | 9/2005 | Sweeney | G06Q 30/02 |
| | | | | 705/14.16 |
| 2010/0191836 | A1* | 7/2010 | Knight | H04M 3/436 |
| | | | | 709/220 |
| 2010/0257598 | A1* | 10/2010 | Demopoulos | H04L 63/1441 |
| | | | | 726/13 |
| 2022/0166736 | A1* | 5/2022 | Freed | H04L 51/212 |
| 2022/0247810 | A1* | 8/2022 | Bennett | H04L 51/48 |
| 2022/0345483 | A1* | 10/2022 | Shua | H04L 9/0825 |

* cited by examiner

*Primary Examiner* — Brandon Hoffman (57) ABSTRACT

There is provided a computer implemented method of operating a security interface deployed within a target computing environment for controlling access to email-data, comprising: receiving, via the security interface deployed within the target computing environment, a request from a service computing environment for accessing email-data of the target computing environment, accessing, by the security interface, email-data of the target computing environment obtained from an email provider interface providing email services to the target computing environment, applying a filter to the email-data to generated filtered email-data, and providing the filtered email-data, by the security interface, to the service computing environment, wherein access to the email-data prior to application of the filter by the service computing environment, is blocked.

29 Claims, 6 Drawing Sheets

| Name | Description | Filtering entity | Default | Example |
|---|---|---|---|---|
| Included "From" address domains | Comma separated list of domain to only query when fetching data from email providers. This can be used to scope the system to an allowed list of domains | When supported: Email provider interface filters Otherwise: Filter in target computing environment | Empty | zoom.us, figma.com,attlasian.net |
| Excluded "From" address domains | Comma separated list of additional domains to add to exclusion list when fetching data from email providers. This can be used to exclude sensitive internal and/or external domains. | When supported: Email provider interface filters Otherwise: Filter in target computing environment | Customer internal email domains, Email domains belonging to private individuals | gmail.com, .gov |
| Included users scope | Comma separated list of user emails to scope. | When supported: Email provider interface filters and/or identity provider interface controls Otherwise: Filter in target computing environment | User scope as defined by the deploying entity | user-a@acme.com, user-b@acme.com |
| Excluded email subject terms | Comma separated list of terms to exclude when fetching data from email providers | When supported: Email provider interface filters Otherwise: Filter in target computing environment | Empty | "[Internal]","earnings"," m&a" |

SECURITY INTERFACE FOR CONTROLLING ACCESS TO EMAIL-DATA

BACKGROUND

The present invention, in some embodiments thereof, relates to security of data and, more specifically, but not exclusively, to systems and methods for controlling access to email-data for security thereof.

Email is widely accessed by users via an organization's network. The email is usually hosted by an external server, accessed by the users via the organization's network. External access is commonly facilitated through email protocols, webmail interfaces, and mobile applications. Organizations implement security measures to protect against unauthorized access to their emails.

SUMMARY

According to a first aspect, a computer implemented method of operating a security interface deployed within a target computing environment for controlling access to email-data, comprises: receiving, via the security interface deployed within the target computing environment, a request from a service computing environment for accessing email-data of the target computing environment, accessing, by the security interface, email-data of the target computing environment obtained from an email provider interface providing email services to the target computing environment, applying a filter to the email-data to generated filtered email-data, and providing the filtered email-data, by the security interface, to the service computing environment, wherein access to the email-data prior to application of the filter by the service computing environment, is blocked.

According to a second aspect, a system for operating a security interface deployed within a target computing environment for controlling access to email-data, comprises: at least one processor executing a code for: receiving, via the security interface deployed within the target computing environment, a request from a service computing environment for accessing email-data of the target computing environment, accessing, by the security interface, email-data of the target computing environment obtained from an email provider interface providing email services to the target computing environment, applying a filter to the email-data to generated filtered email-data, and providing the filtered email-data, by the security interface, to the service computing environment, wherein access to the email-data prior to application of the filter by the service computing environment, is blocked.

According to a third aspect, a non-transitory medium storing program instructions for operating a security interface deployed within a target computing environment for controlling access to email-data, which when executed by at least one processor, cause the at least one processor to: receive, via the security interface deployed within the target computing environment, a request from a service computing environment for accessing email-data of the target computing environment, access, by the security interface, email-data of the target computing environment obtained from an email provider interface providing email services to the target computing environment, apply a filter to the email-data to generated filtered email-data, and provide the filtered email-data, by the security interface, to the service computing environment, wherein access to the email-data prior to application of the filter by the service computing environment, is blocked.

In a further implementation form of the first, second, and third aspects, access for defining a policy of the filter by the service computing environment, is blocked.

In a further implementation form of the first, second, and third aspects, access for defining a policy of the filter by the target computing environment, is enabled.

In a further implementation form of the first, second, and third aspects, access to the email-data without application of the filter, is enabled for the target computing environment.

In a further implementation form of the first, second, and third aspects, direct access to the email provider interface by the service computing environment, is blocked.

In a further implementation form of the first, second, and third aspects, the filter is applied by the security interface according to a policy defined by the target computing environment.

In a further implementation form of the first, second, and third aspects, the filter is applied by the email provider interface according to a policy defined by the target computing environment.

In a further implementation form of the first, second, and third aspects, the service computing environment accesses the filtered email-data via the security interface deployed on the target computing environment.

In a further implementation form of the first, second, and third aspects, data pullers deployed on the service computing environment pull the filtered email-data from the email provider interface via the security interface.

In a further implementation form of the first, second, and third aspects, the request is sent by data pullers deployed on the service computing environment for instructing the security interface for pulling of the filtered email-data from the email provider interface.

In a further implementation form of the first, second, and third aspects, data pullers deployed on the target computing environment pull the filtered email-data from the email provider interface, and send the filtered email-data to the service computing environment via the security interface.

In a further implementation form of the first, second, and third aspects, the data pullers deployed on the target computing environment operate according to instructions received from the service computing environment via the security interface.

In a further implementation form of the first, second, and third aspects, further comprising, in response to the providing the filtered email-data to the service computing environment, receiving by the target computing environment from the service computing environment, an outcome of processing and/or analyzing the filtered email-data by the service computing environment.

In a further implementation form of the first, second, and third aspects, further comprising: accessing, by the security interface, identity-data of the target computing environment obtained from an identity provider (IDP) interface providing identity authentication services to the target computing environment, providing the identity-data, by the security interface, to the service computing environment, and wherein the outcome received from the service computing environment is of processing and/or analyzing a combination of the filtered email-data and the identity-data.

In a further implementation form of the first, second, and third aspects, access to the IDP interface by the service computing environment, is blocked.

In a further implementation form of the first, second, and third aspects, the outcome received from the service computing environment includes at least one of: at least one indication of at least one software as a service (SaaS) hosted by an external computing environment accessed via the target computing environment, identification and/or analysis of billing invoices, monitoring communication with one or more cloud services, and analysis of online shopping.

In a further implementation form of the first, second, and third aspects, the filter is configurable for at least one of the following features: auditing queries to verify the filter, control policy of the filter, and changing the policy applied by the filter.

In a further implementation form of the first, second, and third aspects, a policy of the filter includes at least one of: from address domains of emails to maintain, from address domains of emails to exclude, users scope of emails to include, email subject terms of emails to exclude.

In a further implementation form of the first, second, and third aspects, keys for the email provider interface are accessible by the target computing environment, and access to the keys is blocked for the service computing environment.

In a further implementation form of the first, second, and third aspects, the service computing environment is hosted by a computing cloud that receives a plurality of different sets of filtered email-data from a plurality of different instances of the security interface deployed within a plurality of different target computing environments, the plurality of different sets of filtered email-data obtained by applying different respective filters to different sets of email-data, wherein access to a certain email-data prior to application of a respective filter is enabled for a corresponding target computing environment and blocked for other target computing environments and to the service computing environment.

In a further implementation form of the first, second, and third aspects, the target computing environment includes a plurality of client terminals used by a plurality of end users, wherein the email provider interface provides email services to the plurality of end users.

In a further implementation form of the first, second, and third aspects, the service computing environment and the target computing environment are each implemented as respective virtual private computing clouds, wherein the virtual private cloud implementing the service computing environment initiates a peer to peer network connection with the virtual private cloud implementing the target computing environment for routing traffic using private IP addresses.

In a further implementation form of the first, second, and third aspects, the filter is configured for applying at least one always-on exclusion rule for filtering of the email-data obtained from the email provider interface.

In a further implementation form of the first, second, and third aspects, the at least one always-on exclusion rule is selected from: excluding specific mail prefixes in a subject, excluding a domain for a specific inbox as an email source, excluding emails without recipients, excluding emails with more than one recipient, and excluding emails with automatic reply addresses.

In a further implementation form of the first, second, and third aspects, further comprising receiving by the security interface from the service computing environment, a unique token for authenticating requests from the service computing environment.

In a further implementation form of the first, second, and third aspects, further comprising code for receiving by the security interface from the service computing environment, instructions on obtaining identity provider data from an identity provider and/or for setting up a secrets store to be consumed by the security interface, the secrets store including data for accessing the email provider interface, wherein access to the secrets store by the security computing environment is blocked.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the Drawings.

DETAILED DESCRIPTION

The present invention, in some embodiments thereof, relates to security of data and, more specifically, but not exclusively, to systems and methods for controlling access to email-data for security thereof.

As used herein, the terms filter policy and filter may be used interchangeably. For example, the phrase configuring the policy of the filter and configuring the filter may be interchanged.

As used herein, the target computing environment and/or the service computing environment may include client terminal connected to them, and/or users using them. For example, access to the target computing environment (e.g., to unfiltered email-data) may refer to access to users and/or client terminals (e.g., used by the user) of the target computing environment.

An aspect of the present invention relates to systems, methods, computing devices, and/or code instructions (stored on a data storage device and executable by one or more processors) for operating a security interface deployed within a target computing environment for controlling access to email-data. A request from a service computing environment for accessing email-data of the target computing environment is received via the security interface deployed within the target computing environment. Email-data of the target computing environment is accessed by the security interface. The email-data is obtained from an email provider interface providing email services to, or within, the target computing environment, for example, to multiple client terminals accessing the email-data via the target computing environment. A filter is applied to the email-data to generated filtered email-data. The filter may be applied according to a defined policy. Access to the email-data prior to application of the filter by the service computing environment, is blocked. The filtered email-data is provided by the security interface, to the service computing environment. The service computing environment may process the email-data, and may provide an outcome of the processing to the target computing environment, for example, as part of a service.

The security interface deployed within the target computing environment may secure the email-data against external threats by restricting access to authenticated entities. For example, access for defining a policy of the filter by the service computing environment, is blocked. In another example, access for defining a policy of the filter by the target computing environment, is enabled. In yet another example, access to the email-data without application of the filter by the target computing environment, is enabled. In yet another example, direct access to the email provider interface by the service computing environment, is blocked.

At least some embodiments described herein address the technical problem of securing access to emails of a target computing environment (e.g., users thereof) by a service computing environment providing services to the target computing environment. The service computing environment may analyze the accessed the email-data of the target computing environment to provide the services. The access to email-data of the target computing environment by the service computing environment may pose a security risk. At least some embodiments described herein improve the technical field of network security, by securing access to email-data of the target computing environment by the service computing environment. At least some embodiments described herein improve upon prior approaches for securing access to email-data. Prior approaches are based on all or nothing, i.e., either full access to email-data of the target computing environment is granted to the service computing environment, or access to the email-data is blocked for the service computing environment.

At least some embodiments described herein solve the aforementioned technical problem, and/or improve the aforementioned technical field, and/or improve upon the aforementioned technical approaches, by providing a security interface designed to be deployed within the target computing environment. The security interface controls access to a filter policy for a filter that is applied to the email data for generating the filtered email data. Access of the service computing environment to the filtered email data is controlled and/or enabled by the security interface. By deploying the security interface on the target computing environment, access to the filtered email and/or to the filter policy is controlled by the target computing environment, and blocked or restricted for the service computing environment based on a policy set by the target computing environment. Access to the filtered email data by the service computing environment is controlled by the target computing environment, and restricted to the target computing environment. The service computing environment may be excluded from control to the filter policy. Deployment of the security interface at the target computing environment secures the email-data against access by unauthorized entities.

In at least some embodiments described herein, in an environment in which a service computing environment provides services based on data collected from the target computing environment, deploying the security interface within the target computing environment (e.g., client side) provides increased security, for example, by one or more of:

Controlling access to email-data of the target computing environment by the service computing environment according to a configured policy. For example, limiting access to filtered email-data, which may include only certain types of email-data, for example, emails from certain senders or domains, or characterized with certain patterns in content or metadata.

The control of access by the service computing environment may be restricted to the target computing environment, i.e., the target computing environment may define what email-data the service computing environment may access. Protection of email-data of the target computing environment may be under complete control of the target computing environment.

Data minimization principle-email-data accessed by the service computing environment may be limited to the minimum amount of email-data required to provide the services. In some implementations, a small percentage and/or small amount of email-data of the entire amount of email-data is needed for processing by the service computing environment to provide its service. Access to additional data outside the scope of the minimum amount of data required, such as sensitive email-data, may be blocked to the service computing environment.

The security interface may function as an intermediary between an email provider (e.g., API), optionally an identity provider, and the service computing environment, for controlling flow of data and/or access to data between the email provider, optional identity provider, and the service computing environment.

Comprised keys, such as for the email provider API and/or for the identity provider API, may lead to data exposure. The keys (e.g., API) keys may remain within the target computing environment (e.g., client side), under control and/or protection of the keys, which reduces and/or prevents compromise of the keys via the service computing environment. In the event of a security comprise occurring at the service computing environment, a threat actor is unable to issue API queries themselves, since the threat actor cannot access the API keys via the service computing environment.

Access to data may be audited by the security interface, providing a level of auditing that may not be available by the email provider interfaces.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
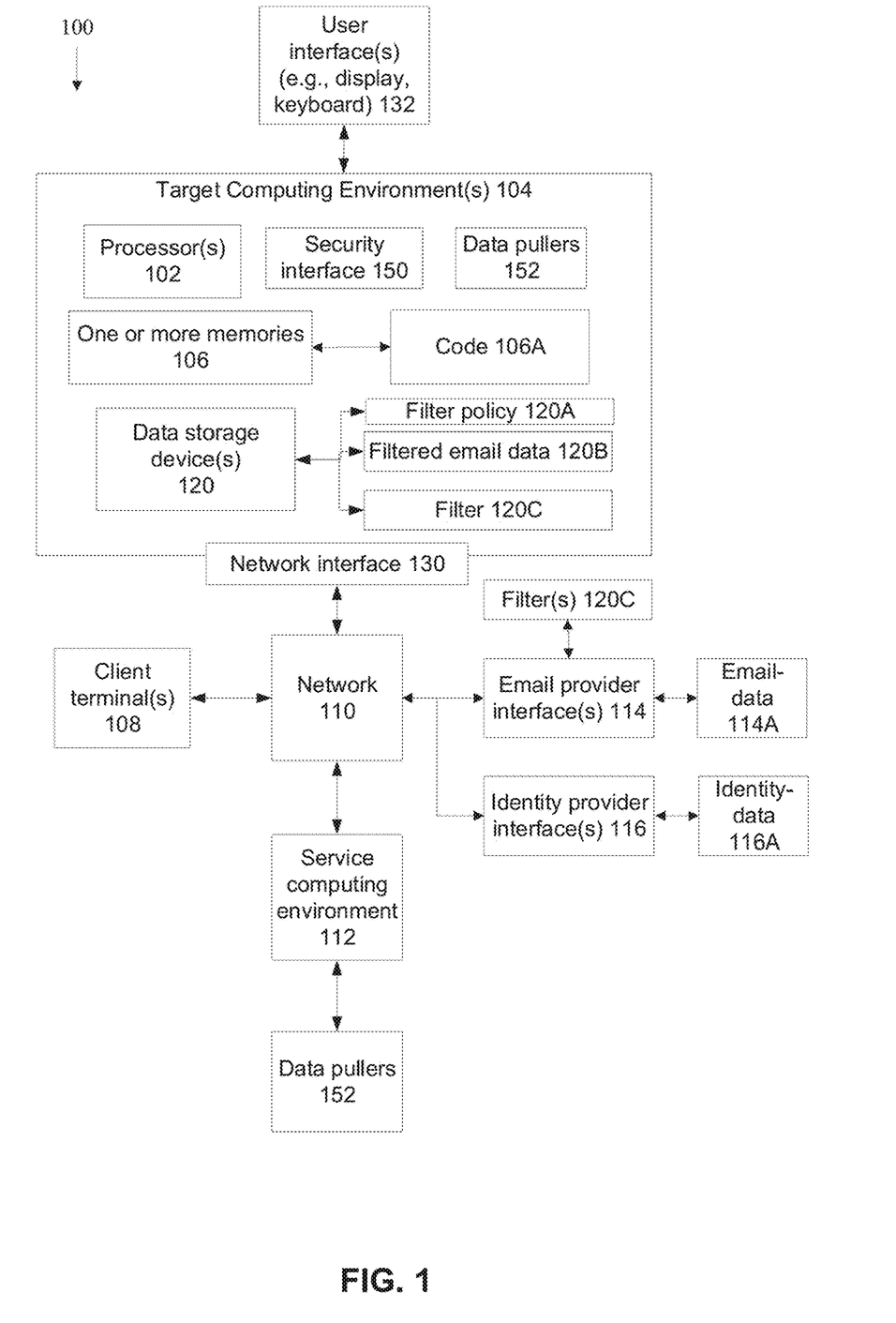
FIG. 1 is a block diagram of components of a system for operating a security interface deployed within a target computing environment for controlling access to email-data, in accordance with some embodiments of the present invention.
Figure 2:
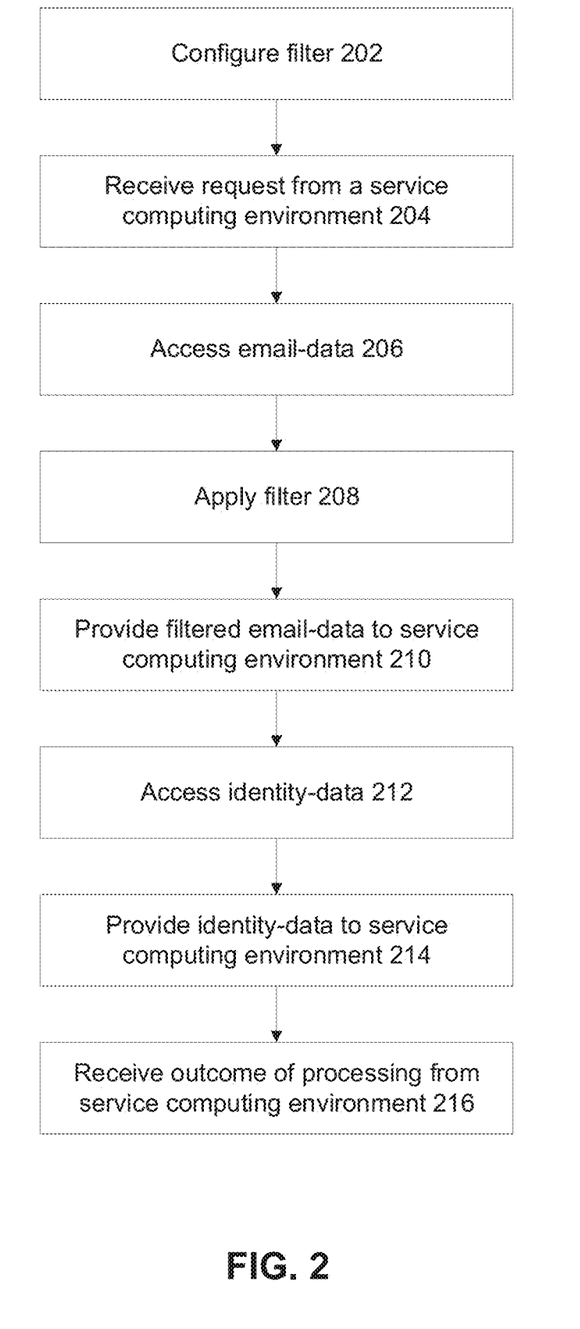
FIG. 2 is a flowchart of a method of operating a security interface deployed within a target computing environment for controlling access to email-data, in accordance with some embodiments of the present invention.
Figure 3:
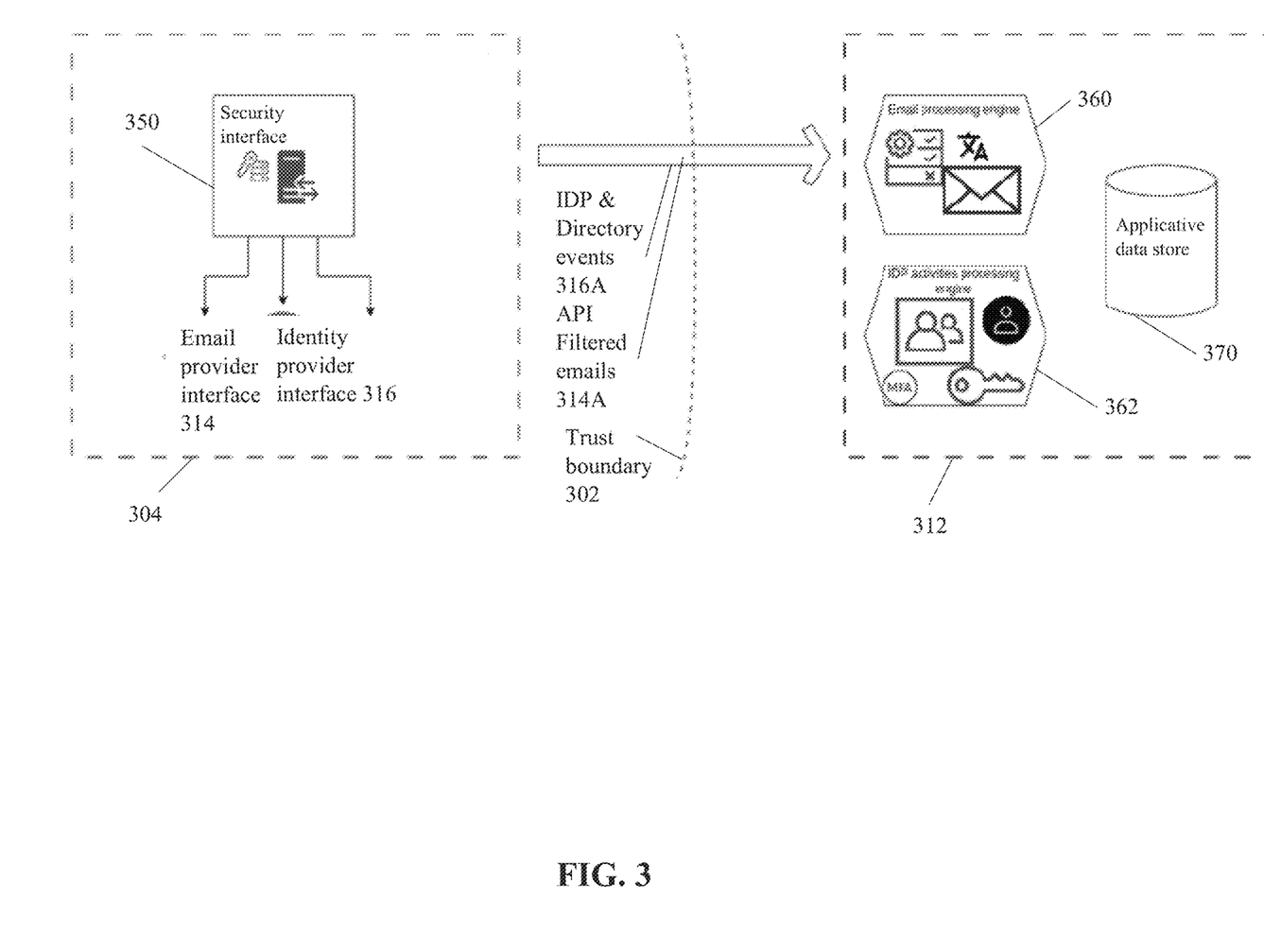
FIG. 3 is a schematic depicting a trust boundary between a target computing environment and service computing environment, where a security interface is deployed within the trust boundary, in accordance with some embodiments of the present invention.
Figure 4:
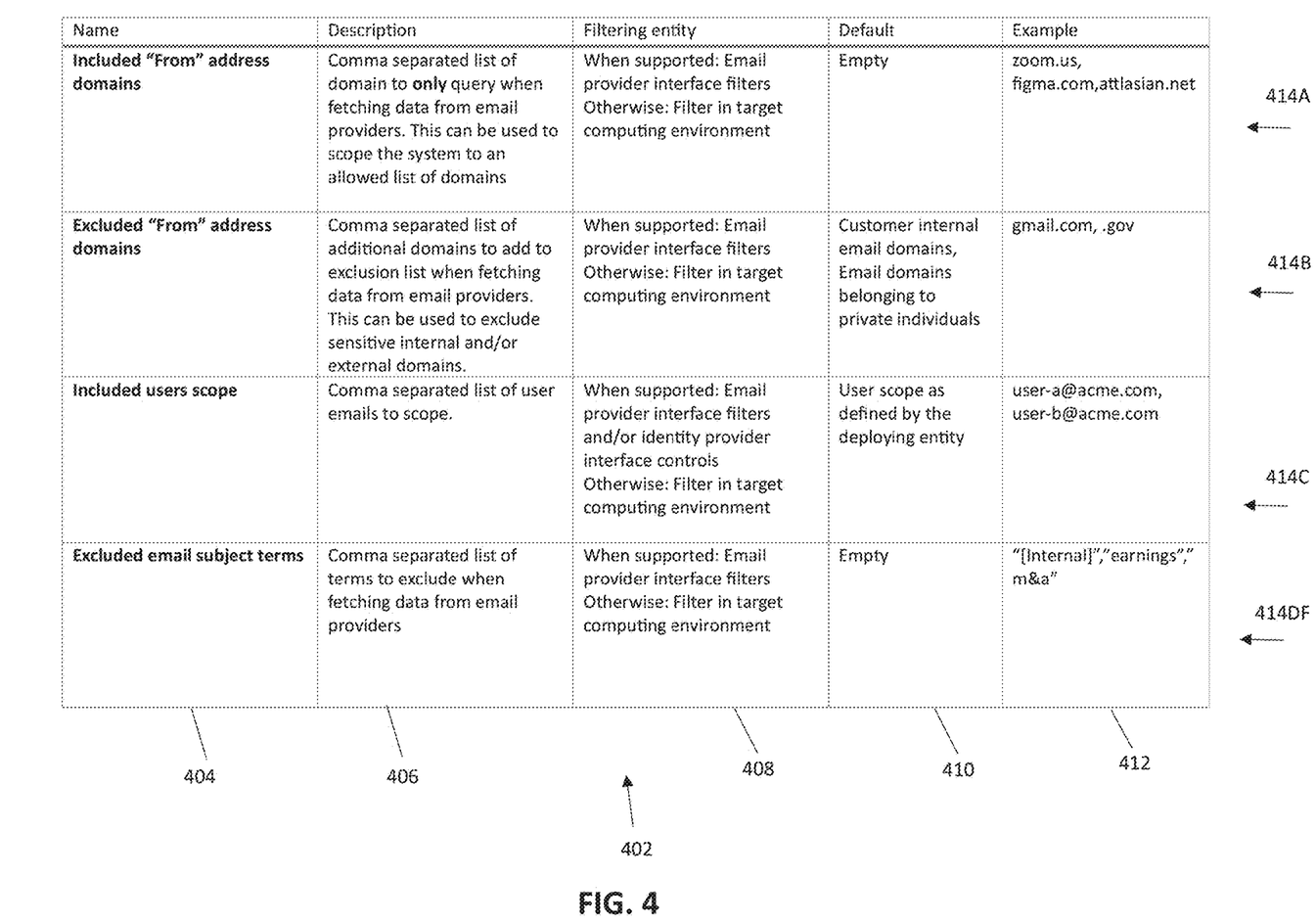
FIG. 4 is a table presenting examples of configurable policies of a filter for filtering email-data, in accordance with some embodiments of the present invention.
Figure 5:
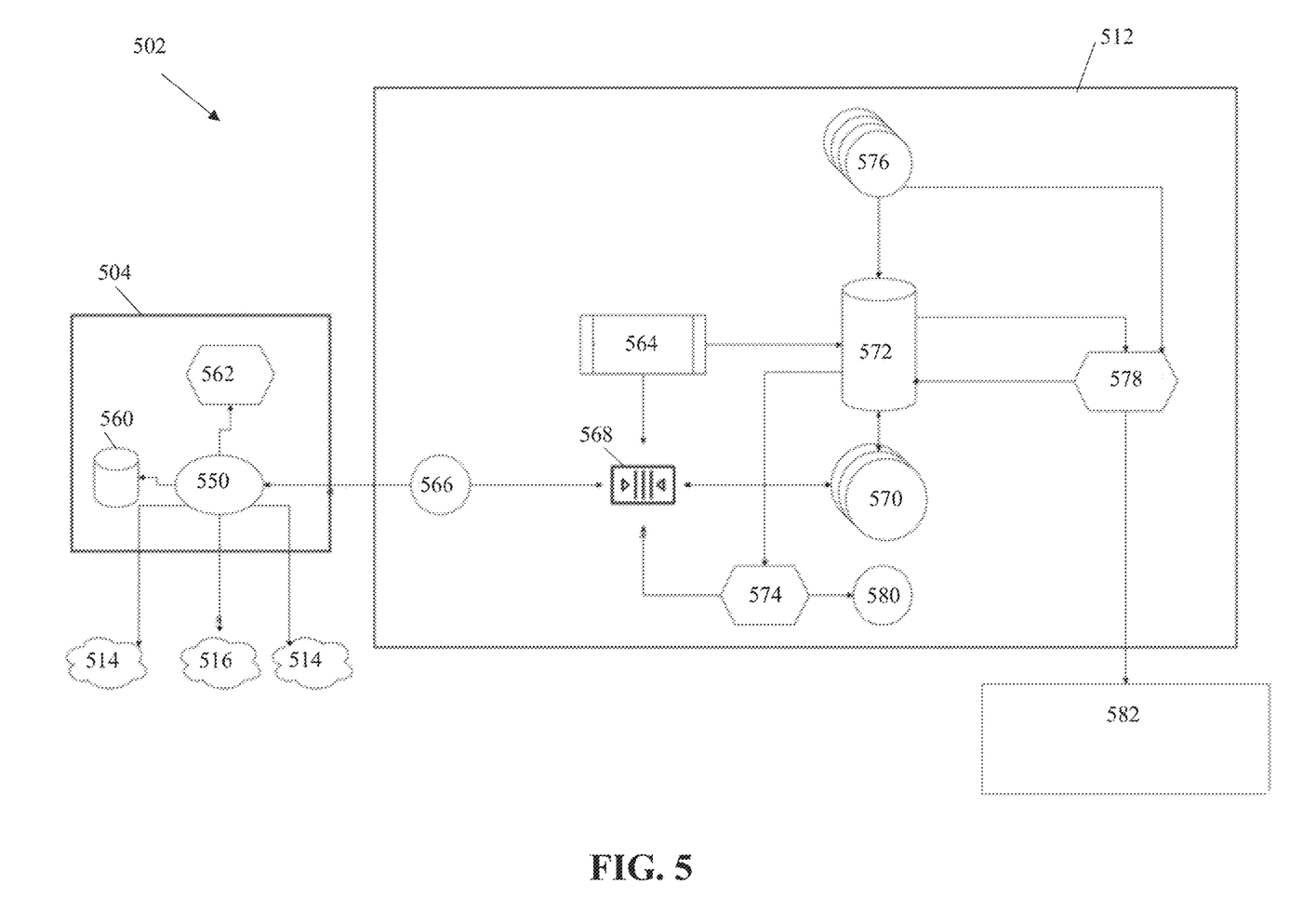
FIG. 5 is a schematic of an exemplary architecture that includes a service computing environment for providing services based on data accessed via a security interface deployed on a target computing environment, in accordance with some embodiments of the present invention.
Figure 6:
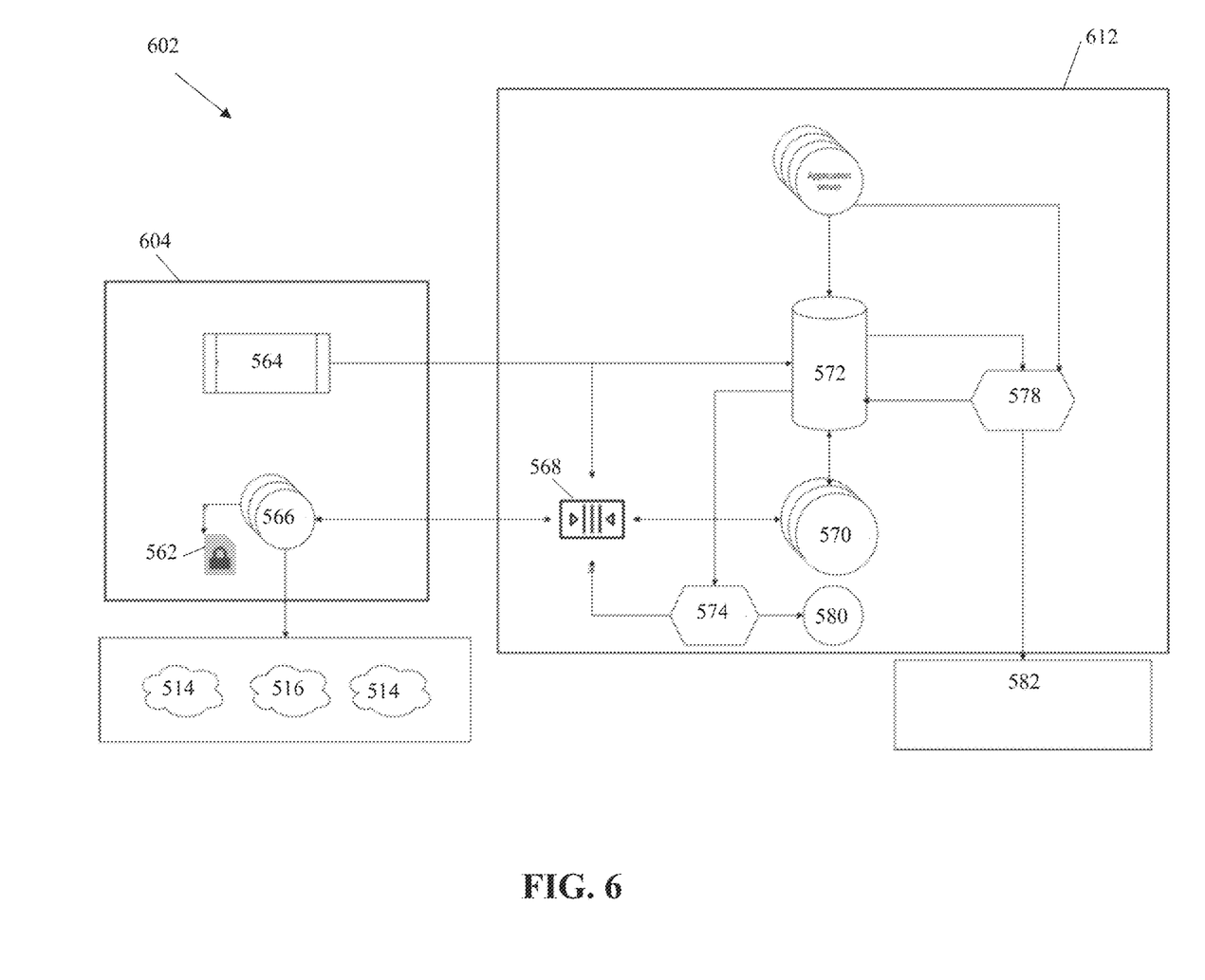
FIG. 6 is a schematic of another exemplary architecture that includes a service provider environment for providing services based on data accessed via security interface deployed on target computing environment, and where components (described with reference to FIG. 5) for orchestrating a discovery process and/or extracting data from API interfaces are deployed on target computing environment, in accordance with some embodiments of the present invention.

Reference is now made to FIG. 1, which is a block diagram of components of a system 100 for operating a security interface 150 deployed within a target computing environment 104 for controlling access to email-data 114A, in accordance with some embodiments of the present invention. Reference is also made to FIG. 2, which is a flowchart of a method of operating a security interface deployed within a target computing environment for controlling access to email-data, in accordance with some embodiments of the present invention. Reference is also made to FIG. 3, which is a schematic depicting a trust boundary 302 between a target computing environment 304 and service computing environment 312, where a security interface 350 is deployed within the trust boundary 302, in accordance with some embodiments of the present invention. Reference is also made to FIG. 4, which is a table 402 presenting examples of configurable policies of a filter for filtering email-data, in accordance with some embodiments of the present invention. Reference is also made to FIG. 5, which is a schematic of an exemplary architecture 502 that includes a service computing environment 512 for providing services based on data accessed via a security interface 550 deployed on a target computing environment 504, in accordance with some embodiments of the present invention. Reference is also made to FIG. 6, which is a schematic of another exemplary architecture 602 that includes a service provider environment 612 for providing services based on data accessed via security interface 650 deployed on target computing environment 604, and where components (described with reference to FIG. 5) for orchestrating a discovery process and/or extracting data from API interfaces are deployed on target computing environment 604, in accordance with some embodiments of the present invention.

Components of architecture 502 described with reference to FIG. 5 and/or components of architecture 602 described with reference to FIG. 6 may be implemented by, and/or may correspond to, and/or may include, and/or may be substituted with, one or more components of system 100 described with reference to FIG. 1, and vice versa.

System 100 may implement the acts of the method described with reference to FIG. 2 by processor(s) 102 of target computing environment 104 executing code instructions 106A stored in a memory 106 (also referred to as a program store).

Target computing environment 104 may be implemented as, for example one or more and/or combination of: a computing cloud, a group of connected devices, a server, a virtual server, a client terminal, a virtual machine, a desktop computer, a thin client, a network node, and/or a mobile device (e.g., a Smartphone, a Tablet computer, a laptop computer, a wearable computer, glasses computer, and a watch computer).

Target computing environment 104 hosts security interface 150, which communicates with a service computing environment 112. Security interface 150 controls access to filtered email data 120B by security computing environment 112. Filtered email data is generated by applying a filter 120C defined by a filter policy 120A to email-data 114A obtained by security interface 150 via an email provider interface 114. Filter 120C may be applied by security interface 150 at target computing environment 104 to generate filtered email data 120B, and/or filter 120C may be applied by email provider interface 114 to provide filtered email data 120B. Security interface 150 may control access to filter policy 120A, by blocking access to filter policy 120A by service computing environment 112 and enabling access to filter policy 120A by authorized users of target computing environment 104. Security interface 150 may be set to block access by service computing environment 112 to email data 114A and to enable access (e.g., non-block) to filtered email data 120B. Security interface 150 may obtain identity-data 116A via an identity provider interface 116. The identity-data 116A obtained via security interface 150 may be provided to service computing environment 112.

Data pullers 152 for pulling the email data 114A from email provider interface 114 may be deployed on target computing environment 104 and/or on service computing environment 112. The filter 120C may be applied Data pullers 152 may pull filtered email data 120B.

One or more client terminals 108 may access target computing environment 104, optionally via network 110. The client terminals 108 may modify filter policy 120A (e.g., according to security settings defining which users are authorized to perform the modifications) and/or may access email data 114A and/or identity-data 116A.

Multiple client terminals 108 used by multiple end users may access email-data 114A via target computing environment 104 accessing email provider interface(s) 114 that provides email services to the end users.

Service computing environment 112 may provide one or more services to target computing environment 104 based on an analysis of filtered email data 120B and identity-data 116A, for example, monitoring for software as a service (SaaS) accessed by client terminal(s) 108 via target computing environment 104 and/or other examples described herein.

Service computing environment 112 may provide services to multiple target computing environments 104 based on different instances of the security interface 150 deployed on each respective target computing environment 104.

Service computing environment 112 may provide the services as a SaaS to the target computing environments 104.

Service computing environment 112 may be implemented as and/or hosted by, for example, a computing cloud, a group of connected devices, a server, a virtual server, other architectures, and combinations therefore.

Optionally, service computing environment 112 and/or and target computing environment 104 are implemented as respective virtual private computing clouds. A virtual private cloud implementing service computing environment 112 may initiate a network connection, optionally a peer to peer network connection, with the virtual private cloud implementing target computing environment 104, for routing traffic using private IP addresses.

Security interface 150, when deployed on target computing environment 104, is designed to communicate with service computing environment 112. Security interface 150 may be implemented as, for example, an application programming interface (API), software development kit (SDK)), an application for local download to the target computing environment 104, target computing environment 104 and/or functions using a remote access session to the target computing environment 104, such as through a web browser executed by target computing environment 104 accessing a web site hosted by service computing environment 112 enabling remote access of target computing environment 104.

Optionally, service computing environment 112 provides services (e.g., processing and/or analysis of email-data) to multiple target computing environments 104. Service computing environment 112 may receive multiple different sets of filtered email-data 114A from different instances of security interface 150 deployed within multiple different target computing environments 104. The multiple different sets of filtered email-data may be obtained by applying different respective filters 120C to different sets of email-data 114A, such as of the different users of each respective target computing environment 104. Access to a certain email-data 114A prior to application of a respective filter 120C may be enabled for a corresponding target computing environment and blocked for other target computing environments, and blocked to the service computing environment 112.

Security interface 150, when deployed on target computing environment 104, is designed to communicate with email providers via email provider interface 114 and/or with identity providers with identity provider interface 116.

The following are exemplary not necessarily limiting prerequisites for deployment of security interface 150 on target computing environment 104:

A system capable of managing containerized workloads installed on target computing environment 104.

Network access: an inbound TLS (443) connection by firewalls installed on target computing environment 104.

A unique API gateway token authenticating security interface requests stored on and/or by target computing environment 104.

Identity provider (IDP)/email provider API credentials stored in a supported secrets stored hosted by the target computing environment 104.

Processor(s) 102 of target computing environment 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 2 when executed by processor(s) 102.

Target computing environment 104 may include a data storage device 120 for storing data, for example, a filter policy 120A (defining the policy for filtering of email data 114A to generate filtered email data 120B by filter 120C), the filtered email data 120B, and the filter 120C. Data storage device 120 may be implemented as, for example, a memory, a local hard-drive, virtual storage, a removable storage unit, an optical disk, a storage device, and/or as a remote server and/or computing cloud (e.g., accessed using a network connection).

Computing environment 104 may include a network interface 130 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 110 may be implemented as, for example, the internet, a local area network, a virtual network, a wireless network, a cellular network, a local bus, a point to point link (e.g., wired), and/or combinations of the aforementioned.

Target computing environment 104 may include and/or is in communication with one or more physical user interfaces 132 that include a mechanism for a user to enter data (e.g., manually define the filter policy 120A) and/or view data (e.g., view the filtered email data 120B). Exemplary user interfaces 132 include, for example, one or more of, a touchscreen, a display, a virtual reality display (e.g., headset), gesture activation devices, a keyboard, a mouse, and voice activated software using speakers and microphone.

Email data 114A may include emails and/or associated metadata of users and email belonging to the target computing environment 104.

Email provider interface 114 and/or identity provider interface 116 may be implemented as, for example, APIs of email providers and/or identity providers.

Identity-data 116A may include, for example data of users that access email-data 114A, for example, for enabling matching email-data 114A with users. In another example, identity-data 116A may include an indication of events associated with email-data 114A, for example, when users accessed email-data 114A and/or how the users accessed email-data 114A.

Referring now back to FIG. 2, at 202, a filter policy which is applied by a filter to the email-data to generate filtered email-data may be configured.

The security interface provides access to the filtered email-data (generated based on email-data of the target computing environment) to the service computing environment.

The filter may be configurable for one or more of the following features: auditing queries to verify the filter, controlling policy of the filter, and changing the policy applied by the filter (e.g., change management).

The filter policy may include one or more adjustable parameters, defining which email characteristics of emails should lead to an email being included in the filtered email-data and/or which email characteristics of emails should lead to an email being excluded from the filtered email-data. The phrases configuring the filter policy and configuring the adjustable parameters of the filter may be interchanged.

The filter policy may be stored on the target computing environment, and/or accessible by the target computing environment. Access to the filter policy by external entities, including the service computing environment, may be blocked.

Access for defining (i.e., configuring) a policy of the filter may be blocked for the service computing environment. This may prevent security breaches, for example, where a malicious entity attempts to use the service computing environment for adjusting the policy of the filter to enable access to sensitive emails.

Access for defining a policy of the filter by the target computing environment may be enabled. For example, an authorized user of the target computing environment may configure the policy of the filter.

The filter may be configured for applying one or more always-on exclusion rules for filtering of the email-data obtained from the email provider interface. It is noted that the filtering provided by the email provider interface may lack support for use cases listed in the bullet list of examples below. Examples of the always-on exclusion rule(s) include:

Excluding specific mail prefixes in a subject, for example, "Re:", "Fwd:", and "Fw:".

Excluding a domain for a specific inbox as an email source. For example, when querying for emails for the inbox of john@example.com, emails originating from example.com may be excluded.

Excluding emails without recipients.

Excluding emails with more than one recipient.

Excluding emails with automatic reply addresses.

Referring now back to FIG. 4, table 402 presents examples of configurable policies of a filter for filtering email-data. The configuration of the filter policy may be performed by the target service environment in which the security interface is installed (e.g., client side, customer configurable). The security interface provides access for the service computing environment to the filtered emails, which are filtered according to the configurable policy.

A "Name" field 404 indicates a configurable parameter of the policy. A "description" field 406 describes the configurable parameter. A "Filtering entity" field 408 indicates where the filter is applied to the email-data according to the configured policy, such as at the security interface, and/or at the interface (e.g., API) of the email provider. A "default" field 410 indicates a default value. An "example" field 412 provides an example of the configurable parameter.

Rows 414A-D are some examples of the configurable parameters. Row 414A relates to the configurable parameter indicating a "From" address domains of emails to maintain (i.e., include in the filtered emails). Row 414B relates to address domains of emails to exclude from the filtered emails. Row 414C relates to users scope of emails to include in the filtered emails. Row 414D relates to subject terms of emails to exclude from the filtered emails.

Referring now back to FIG. 2, at 204, a request from the service computing environment for accessing email-data of the target computing environment is received via the security interface deployed within the target computing environment.

Alternatively or additionally, the request includes a request for accessing identity-data of the target computing environment.

Optionally, prior to receiving the request, the service computing environment provides a unique token (e.g., API token) to be used to authenticate requests from the service computing environment. The unique token may be received by the security interface from the service computing environment.

Optionally, the service computing environment provides instructions to the target computing environment on obtaining credentials from email providers and/or identity providers and/or for setting up a secrets store to be consumed by the security interface.

Optionally, the service computing environment initiates the request (e.g., HTTPS request) to the security interface.

The service computing environment may provide, for example, AWS and/or VPC peering and/or provide an IP range to whitelist, for example, based on preferences by the target computing environment (e.g., user preferences).

The request may be sent by data pullers. The data pullers may be deployed on the service computing environment, for instructing the security interface for pulling of the filtered email-data from the email provider interface.

Optionally, instructions on obtaining identity-data (e.g., credentials) from an identity provider (e.g., interface) are received by the security interface from the service computing environment.

Optionally, instructions on setting up a secrets store to be consumed by the security interface, are received by the security interface from the service computing environment. The secrets store may host secrets for accessing the email provider interface and/or the identity provider interface, for example, API secrets such as API keys. Access to the secrets store by the security computing environment may be blocked. The secrets hosted by the secrets store may remain within the target computing environment.

At 206, email-data of the target computing environment is accessed by the security interface.

The email-data may be obtained from an email provider interface providing email services to the target computing environment.

Keys (e.g., API keys) for the email provider interface may be accessible by the target computing environment. Access to the keys is blocked for the service computing environment. The keys may be stored in the secrets store, which may be established in response to instructions received from the service computing environment.

Access to the email-data (e.g., raw email-data), prior to application of the filter by the service computing environment (e.g., as described with reference to 208) may be blocked for the service computing environment. The blocking prevents the service computing environment from access to all email-data, or a wider amount of email-data over the filtered email data to which access is granted to the service computing environment. Additionally or alternatively, access may be audited prior, and/or after, to the application of the filter by the service computing environment.

Access to the email-data, the raw email data, without application of the filter, is enabled for the target computing environment (e.g., for authorized users thereof).

Direct access to the email provider interface by the service computing environment, is blocked.

At 208, a filter is applied to the email-data to generated filtered email-data.

Optionally, the filter is applied by the security interface. Alternatively or additionally, the filter is applied by the email provider interface.

The filter is applied according to a defined filter policy, for example, as described with reference to 202.

Optionally, data pullers deployed on the target computing environment pull the filtered email-data from the email provider interface. The data pullers deployed on the target computing environment may operate according to instructions received from the service computing environment via the security interface.

An indication of the filter may be written to a file, such as a log file for tracking application of the filter. The log file may be used, for example, for auditing by the security interface, which may provide a level of auditing that may not be available by the email provider interfaces.

At 210, the filtered email-data is provided to the service computing environment.

Optionally, the filtered email-data is provided to the service computing environment by the security interface.

Alternatively or additionally, the service computing environment accesses the filtered email-data via the security interface deployed on the target computing environment. The service computing environment may access the security interface to obtain the filtered email-data. Alternatively or additionally, the service computing environment may access the email provider interface via the security interface to obtain the filtered email-data.

Alternatively or additionally, data pullers deployed on the target computing environment send the filtered email-data to the service computing environment via the security interface. Alternatively or additionally, the data pullers deployed on the service computing environment pull the filtered email-data. The data pullers deployed on the service computing environment may pull the filtered email-data from the security interface, and/or from the email provider interface via the security interface.

At 212, optionally, identity-data of the target computing environment may be accessed by the security interface. The identity-data may be obtained from an IDP interface providing identity authentication services to the target computing environment.

The identity-data may be obtained from the IDP interface by the security interface. Alternatively or additionally, the identity-data may be obtained from the IDP interface by the data pullers hosted by the target security interface.

Access to the IDP interface by the service computing environment, is blocked. Access to the IDP interface by the target computing environment, is enabled.

The identity-data may include, for example, data of users that access the email-data (e.g., credentials), an indication of events associated with the email-data (e.g., when users accessed email-data and/or how the users accessed the email-data), users matched with email-data, and the like.

At 214, optionally, the identity-data may be provided to the service computing environment.

The identity-data may be provided to the service computing environment by the security interface. Alternatively or additionally, the service computing environment may access the identity-data using the identity provider interface via the security interface. Alternatively or additionally, the identity-data is accessed by data pullers hosted on the service computing environment, optionally by pulling the identity data using the identity provider interface via the security interface.

At 216, an outcome may be received from the service computing environment. The outcome may be received in response to the providing the filtered email-data and optionally the identity-data to the service computing environment.

The outcome may be generated by the service computing environment processing and/or analyzing the filtered email-data and/or the identity-data, optionally a combination of the filtered email-data and the identity-data.

The outcome may be received by the target computing environment from the service computing environment. Alternatively or additionally, the outcome may be sent to another computing environment. The outcome may be provided via the security interface, and/or via another communication channel.

Examples of Outcomes Include:
  An indication(s) of at least one software as a service (SaaS) hosted by an external computing environment accessed via the target computing environment and/or by the users therein. The indication(s) may include, for example, one of: SaaS being used, discovery of which users are accessing which SaaS, how users are accessing SaaS, newly adopted SaaS, trending SaaS, inactive and/or abandoned SaaS.
  Identification and/or analysis of billing invoices.
  Monitoring communication with one or more cloud services. For example, a platform for developers to transfer and/or store their applications, storage service, and the like.
  Analysis of online shopping.
  Analysis of application consumption based on sign-in logs obtained through collected identity-data or email-data.

Referring now back to FIG. 3, trust boundary 302 separates between target computing environment 304 and service computing environment 312. Trust boundary 302 may refers to the point at which service computing environment 312 is considered untrusted, and target computing environment 304 is considered trusted.

Security interface 350 is deployed within target computing environment 304, controlling access to filtered email-data 314A obtained from email provider interface(s) 314 (e.g., API) and optional to identity-data 316A (e.g., IDP and directory events) obtained from identity provider interface(s) 316 (e.g., API).

Service computing environment 312 may apply an email processing engine 360 and/or an IDP activities processing engine 362 to email data 314A and/or identity-data 316A to provide services.

Service computing environment 312 may include an applicative data store 370. The data store (e.g., database) may be hosted in a virtual private cloud (VPC) that includes the extracted outcomes from the data pulled and filtered from IDP and email.

Referring now back to FIG. 5, architecture 502 of service provider environment 512 for providing services based on data accessed via security interface 550 deployed on target computing environment 504, is depicted. Architecture 502 may be designed to provide one or more of:
  Strong technical controls to ensure every API request received from service computing environment 512 is filtered according to the filter policy, which restricts access to sensitive data (i.e., non-filtered emails) by service computing environment 512.
  Ensuring API secrets (e.g., credentials for accessing APIs of the email provider and/or identity provider) stay within the target computing environment, reducing risk of leakage.
  Greater transparency and control over API interactions.
  Comprehensive logging for auditing and compliance purposes.

A first time setup of API accesses and/or proper networking between security interface 550 and a private tenant instance running on service computing environment 512 may be required. Updating of software versions of security interface 550 may rarely be required.

Security interface 550 may obtain email-data from an email provider interface(s) 514 (e.g. API). A filter is applied to the email-data to generate filtered email-data. Security interface 550 may obtain identity-data from an identity provider interface(s) 516 (e.g., API). Multiple integrations with email, IDP, and/or directory services, may be supported. Data security may be enhanced through the implementation of data filtering mechanisms, for example, within the native API layer. In response to a request issued by service computing environment 512, optionally by data collectors 564, service computing environment 512 may access filtered email-data and/or identity-data via security interface 550.

Security interface 550 may log requests for filtered email-data and/or requests for identity-data received from service computing environment 512, and/or may log accesses to API interfaces 514 and/or 516, in a log database 560. The logs may be used, for example, for verification of usage of API interfaces 514 and/or 516.

API secrets, i.e., credentials for accessing interfaces 514 and/or 516, may be stored on a secret store 562. Data privacy may be enhanced by ensuring that the API secrets never leave target computing environment 504.

Service computing environment 512 may include one or more of the following components:

Runner/Orchestrator 564: The Runner/Orchestrator may serve as the central control unit responsible for managing the entirety of a discovery process.

Data Pullers 566: Data Pullers may be specialized components designed to initiate data retrieval operations from API providers based on requests generated by the Orchestrator.

Queue 568: The Queue component may play a pivotal role in collecting and temporarily storing acquired data. This data may be subsequently processed and ultimately written to the Application Data Store.

Data Processor/Writer 570: May be responsible for reading data from the Queue, the Data Processor/Writer component may invoke the Natural Language Processing (NLP) engine. Detected entities may then be recorded within the Application Data Store.

Application Data Store 572: The Application Data Store may function as the repository for information pertaining to identified assets and the interconnections among them. It may serve as a critical resource leveraged by the Application Server for dashboard presentation and by the Alerting and Reporting Engine.

Workflow Engine 574: The Workflow Engine may be tasked with orchestrating various operational tasks, including but not limited to password reset processes, Saas access removal procedures, and employee off-boarding workflows. Workflow engine 574 may communicate with a browser automation 580 process.

Application Server 576: The Application Server assumes a dual role as both the front-end interface and API gateway, facilitating the presentation of discovered entities to authorized users.

Alert and Reporting Engine 578: The Alert and Reporting Engine may play a vital role in generating alerts and triggering webhook-based integrations with external systems 582, thereby enhancing the system's capacity for real-time notifications and reporting capabilities.

Referring now back to FIG. 6, architecture 602 of service provider environment 612 for providing services based on data accessed via security interface 650 deployed on target computing environment 604, and where components, described with reference to FIG. 5, for orchestrating a discovery process and/or extracting data from API interfaces are deployed on target computing environment 604, is depicted. Other components described with reference to FIG. 5 remain hosted by service provider environment 612.

Architecture 602 may provide one or more of the following:

Enable end users (e.g., customers) to have more control over data extraction and API interaction within their own target computing environment.

Flexibility to adapt to specific cloud and/or data privacy requirements.

The service provider environment may manage the critical data analysis and/or security components.

Examples of operational requirements for implementation of architecture 602 include:

A first time setup of API accesses and/or proper networking between components self-hosted by target component environment 604 and a private tenant instance running on service computing environment 612 may be required.

Periodic updating of software versions of security interface 650.

Stronger dependency on cloud environment offerings and capabilities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant interfaces will be developed and the scope of the term interface is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of operating a security interface deployed within a target computing environment for controlling access by a service computing environment to email-data on the target computing environment, comprising:
   receiving, via the security interface a request from the service computing environment for accessing the email-data of the target computing environment, wherein the security interface is deployed within the target computing environment;
   accessing, by the security interface, the email-data of the target computing environment obtained from an email provider providing email services to the target computing environment;
   applying a filter to the email-data, for each email, to generate filtered email-data; and
   providing the filtered email-data, by the security interface, to the service computing environment,
   wherein access by the service computing environment to the email-data prior to application of the filter, is blocked;
   wherein keys for the email provider interface are accessible by the target computing environment, and access to the keys is blocked for the service computing environment.

2. The computer implemented method of claim 1, wherein access for defining a policy of the filter by the service computing environment, is one of blocked and controlled-by the by the security interface.

3. The computer implemented method of claim 1, wherein access for defining a policy of the filter by the target computing environment, is enabled.

4. The computer implemented method of claim 1, wherein access to the email-data without application of the filter, is enabled for the target computing environment.

5. The computer implemented method of claim 1, wherein direct access to the email provider interface by the service computing environment, is blocked.

6. The computer implemented method of claim 1, wherein the filter is applied by the security interface according to a policy defined by the target computing environment.

7. The computer implemented method of claim 1, wherein the filter is applied by the email provider interface according to a policy defined by the target computing environment.

8. The computer implemented method of claim 1, wherein the service computing environment accesses the filtered email-data via the security interface deployed on the target computing environment.

9. The computer implemented method of claim 1, wherein data pullers deployed on the service computing environment pull the filtered email-data from the email provider interface via the security interface.

10. The computer implemented method of claim 1, wherein the request is sent by data pullers deployed on the service computing environment for instructing the security interface for pulling of the filtered email-data from the email provider interface.

11. The computer implemented method of claim 1, wherein data pullers deployed on the target computing environment pull the filtered email-data from the email provider interface, and send the filtered email-data to the service computing environment via the security interface.

12. The computer implemented method of claim 11, wherein the data pullers deployed on the target computing environment operate according to instructions received from the service computing environment via the security interface.

13. The computer implemented method of claim 1, further comprising, in response to the providing the filtered email-data to the service computing environment, receiving by the target computing environment from the service computing environment, an outcome of processing and/or analyzing the filtered email-data by the service computing environment.

14. The computer implemented method of claim 13, further comprising:
   accessing, by the security interface, identity-data of the target computing environment obtained from an identity provider (IDP) interface providing identity authentication services to the target computing environment, wherein access to the IDP interface by the service computing environment, is blocked.

15. The computer implemented method of claim 14, wherein the outcome received from the service computing environment includes at least one of:
   at least one indication of at least one software as a service (SaaS) hosted by an external computing environment accessed via the target computing environment,
   identification and/or analysis of billing invoices,
   monitoring communication with one or more cloud services, and
   analysis of online shopping.

16. The computer implemented method of claim 1, wherein the filter is configurable for at least one of the following features: auditing queries to verify the filter, control policy of the filter, and changing the policy applied by the filter.

17. The computer implemented method of claim 1, wherein a policy of the filter includes at least one of: from address domains of emails to maintain, from address domains of emails to exclude, users scope of emails to include, email subject terms of emails to exclude.

18. The computer implemented method of claim 1, wherein the service computing environment is hosted by a computing cloud that receives a plurality of different sets of filtered email-data from a plurality of different instances of the security interface deployed within a plurality of different target computing environments, the plurality of different sets of filtered email-data obtained by applying different respective filters to different sets of email-data, wherein access to a certain email-data prior to application of a respective filter is enabled for a corresponding target computing environment and blocked for other target computing environments and to the service computing environment.

19. The computer implemented method of claim 1, wherein the target computing environment includes a plurality of client terminals used by a plurality of end users, wherein the email provider interface provides email services to the plurality of end users.

20. The computer implemented method of claim 1, wherein the service computing environment and the target computing environment are each implemented as respective virtual private computing clouds, wherein the virtual private cloud implementing the service computing environment initiates a peer to peer network connection with the virtual private cloud implementing the target computing environment for routing traffic using private IP addresses.

21. The computer implemented method of claim 1, wherein the filter is configured for applying at least one always-on exclusion rule for filtering of the email-data obtained from the email provider interface.

22. The computer implemented method of claim 21, wherein the at least one always-on exclusion rule is selected from: excluding specific mail prefixes in a subject, excluding a domain for a specific inbox as an email source, excluding emails without recipients, excluding emails with more than one recipient, and excluding emails with automatic reply addresses.

23. The computer implemented method of claim 1, further comprising receiving by the security interface from the service computing environment, a unique token for authenticating requests from the service computing environment.

24. The computer implemented method of claim 1, further comprising code for receiving by the security interface from the service computing environment, instructions on obtaining identity provider data from an identity provider and/or for setting up a secrets store to be consumed by the security interface, the secrets store including data for accessing the email provider interface, wherein access to the secrets store by the security computing environment is blocked.

25. The computer implemented method of claim 1, wherein the filtering is according to a filter policy that restricts access to unfiltered emails, wherein the filter policy filter policy is controlled by the target computing environment, and blocked restricted for the service computing environment based on a policy set by the target computing environment.

26. The implemented method of claim 1, wherein access by the service computing environment may be restricted by the target computing environment, wherein the target computing environment may define what email-data the service computing environment may access.

27. The implemented method of claim 1, wherein service computing environment includes a combination of two or more of a:
runner/orchestrator wherein the Runner/Orchestrator is a central control unit managing the entirety of a discovery process;
data pullers, wherein Data Pullers may be specialized components designed to initiating data retrieval operations from email providers based on requests generated by the Orchestrator;
queue collecting and temporarily storing acquired data, wherein data is subsequently processed and ultimately written to an application data store;
data processor/writer reading data from the Queue, wherein the Data Processor/Writer invokes a Natural Language Processing (NLP) engine that are then be recorded within an Application Data Store;
application data store is repository for information pertaining to identified assets and the interconnections among them used by an application server for dashboard presentation and by an alerting and reporting engine;
workflow engine for operational tasks, including one of a password reset processes, a SaaS access removal procedures, and an employee offboarding workflows;
application server, wherein the Application Server assumes a dual role as both the front-end interface and API gateway, facilitating the presentation of discovered entities to authorized users; and
alert and reporting engine, wherein the alert and reporting engine generates alerts and triggers a webhook-based integrations with at least one external system for real-time notifications and reporting.

28. A system for operating a security interface deployed within a target computing environment for controlling access to email-data, comprising:
at least one processor executing a code for:
receiving, via the security interface a request from a service computing environment for access to email-data of the target computing environment;
accessing, by the security interface, the email-data of the target computing environment obtained from an email provider providing email services to the target computing environment;
applying a filter to the email-data to generate filtered email-data; and
providing the email-data filtered, by the security interface, to the service computing environment,
wherein access by the service computing environment to the email-data prior to application of the filter, is blocked;
wherein keys for the email provider interface are accessible by the target computing environment, and access to the keys is blocked for the service computing environment.

29. A non-transitory medium storing program instructions for operating a security interface deployed within a target computing environment for controlling access to email-data, which when executed by at least one processor, cause the at least one processor to:
receive, via the security interface deployed within the target computing environment, a request from a service computing environment for accessing email-data of the target computing environment;

access, by the security interface, the email-data of the target computing environment obtained from an email provider interface providing email services to the target computing environment;

apply a filter to the email-data to generate filtered email-data; and provide the email-data filtered, by the security interface, to the service computing environment, wherein access to the email-data prior to application of the filter by the service computing environment, is blocked;

wherein keys for the email provider interface are accessible by the target computing environment, and access to the keys is blocked for the service computing environment.

* * * * *